United States Patent [19]
Proebstle et al.

[11] Patent Number: 5,598,450
[45] Date of Patent: Jan. 28, 1997

[54] FUEL BUNDLE WITH ADJUSTABLE FLOW AND REACTIVITY

[75] Inventors: Richard A. Proebstle; Bruce Matzner, both of San Jose, Calif.

[73] Assignee: General Electric Company, Schenectady, N.Y.

[21] Appl. No.: 624,032

[22] Filed: Mar. 22, 1996

Related U.S. Application Data

[63] Continuation of Ser. No. 347,065, Nov. 23, 1994, abandoned.

[51] Int. Cl.$^6$ .................................................. G21G 3/32
[52] U.S. Cl. ........................ 376/435; 376/439; 376/423; 376/420; 376/424; 376/443; 376/444; 376/456; 376/434; 376/446
[58] Field of Search ........................... 376/435, 439, 376/423, 420, 424, 443, 444, 456, 434, 446; 976/DIG. 103, DIG. 105

[56]  References Cited

U.S. PATENT DOCUMENTS

| 4,432,934 | 2/1984 | Gjertsen et al. | 376/333 |
| 4,664,882 | 3/1987 | Doshi | 376/423 |
| 4,728,487 | 3/1988 | Cooney et al. | 376/327 |
| 5,017,332 | 5/1991 | Dix et al. | 376/370 |
| 5,112,570 | 5/1992 | Dix et al. | 376/370 |
| 5,345,485 | 9/1994 | Patterson et al. | 376/435 |
| 5,375,153 | 12/1994 | Patterson et al. | 376/435 |
| 5,384,815 | 1/1995 | Patterson et al. | 376/444 |

FOREIGN PATENT DOCUMENTS

0561589A1  9/1993  European Pat. Off. .

Primary Examiner—Charles T. Jordan
Assistant Examiner—Meena Chelliah
Attorney, Agent, or Firm—Nixon & Vanderhye P.C.

[57] ABSTRACT

In a fuel bundle for a boiling water nuclear reactor comprising a plurality of fuel rods (20) secured within an array and extending between upper and lower tie plates (24, 22), and including at least one additional partial length fuel rod (20') extending from said lower tie plate (22) but terminating short of said upper tie plate (24), an improvement in the form of a removable extension rod (32) secured to said at least one additional fuel rod (20') and extending substantially to said upper tie plate (24). The removable extension rod (32) also permits variance in the reactivity of the partial length fuel rod (20') particularly in the two phase region of the bundle (10).

13 Claims, 3 Drawing Sheets

FUEL BUNDLE WITH ADJUSTABLE FLOW AND REACTIVITY

TECHNICAL FIELD

This is a continuation of application Ser. No. 08/347,065, filed Nov. 23, 1994, now abandoned.

This invention relates to fuel bundles for use in boiling water nuclear reactors. More specifically, the invention relates to fuel bundles which utilize partial length rods extending from the bottom of the assembly to the regions of the fuel assembly in which two phase steam-water flow occurs. In accordance with this invention, power and flow for fresh fuel with partial length rods can be adjusted to better match power/flow requirements of the existing fuel bundles in the core having full length rods.

BACKGROUND AND PRIOR ART

Modern boiling water nuclear reactors (BWR's) include in the core region of the reactor a core bypass volume and a fuel channel volume. The fuel channel volume includes bundles of elongated rods or cladding containing the reacting fuel. These bundles are placed within surrounding channels between lower and upper tie plates, and held in a predetermined array by spacers located axially along the bundles. In many such fuel bundle designs, one or more hollow tubes or "water rods" are also positioned in the bundle to provide an additional volume of moderating water. The core bypass volume is exterior of the channels. It is the region in which the control rods control the nuclear reaction and includes additional water moderator for efficient reaction.

Current fuel bundle design has been limited by the need to operate below thermal limits and avoid thermal hydraulic instabilities and coupled nuclear-thermal-hydraulic reactor core instabilities. The stability limits affect the degree to which the fuel assembly can be optimized for minimum fuel cycle costs. Current BWR fuel bundle design also is limited by the need to be able to shut the reactor down in the cold state with any control rod stuck in the fully withdrawn position.

For BWR's having discrete bundles of fuel rods confined within channel enclosed fuel assemblies, improved bundles are disclosed in commonly owned U.S. Pat. Nos. 5,017,332 and 5,112,570. In accordance with the disclosures in these patents, partial length rods (PLR's) can be utilized which extend from the bottom of the channel (within the boiling region) only part way to the top of the channel. In other words, these PLR's are axially shortened with respect to the remaining full length rods (FLR's) and are distributed throughout the fuel bundle, with the preferred disposition being in the interior of the bundle of fuel rods, away from the channel walls. In a preferred arrangement, the PLR's extend upwardly from the bottom of the fuel bundle and terminate at a selected spacer located in the two phase flow region of the fuel bundle assembly. Not all PLR's need be of the same length however. For example, some may terminate at one spacer, while others terminate at another spacer, upstream or downstream of the one spacer. Preferably, the length of PLR's is at least one-half of the total height of the fuel bundle.

During power operation, a steam water mixture is present in the open area above the partial length rods. However, when the reactor is shutdown in the cold state this open area is filled with water. Consequently, the PLR's have a larger effect on moderator-to fuel volume ratio in the cold state than in the hot state, which favorably aids in nuclear design of the fuel. During start-up of the reactor, an improved cold shutdown margin is produced at the top of the fuel assembly due to the increased moderator-to-fuel ratio at the top of the fuel assembly. Shutdown control rod worth is improved due to some of the moderator above the PLR's being near the control rods where the increased moderation increases the number of neutrons that are transported or diffused to the control rod surface. During power reactor operation, the PLR's effectively channel steam flow to the expanded interstitial area between rods overlying the ends of the partial length rods. This enables a high slip ratio of steam with respect to water and increases the density of the moderating water about the remaining rods in the upper region of the bundle at power operation. Additional benefits and advantages accruing from the use of PLR's are set out in the '570 and '332 patents. Despite the advantages of using PLR's, there are situations and conditions when the use of such shortened fuel rods is problematic. For example, when reload bundles are inserted into a reactor core, mismatches in relative fuel bundle flow and reactivity can occur between fresh fuel bundles having some PLR's, and old fuel bundles having all FLR's. Presently, control rod movement is the only way to change power and, to a lesser extent, flow mismatches between fuel bundles of different designs and/or operating lifetimes. This can reduce allowable core operating power, particularly in mixed cores containing both PLR's and FLR's.

DISCLOSURE OF THE INVENTION

The principal objective of this invention is to provide a method whereby the power and flow for fresh fuel with PLR's can be adjusted to better match power/flow requirements of the existing fuel bundles of the core. In this way, control rod movement can be minimized and operating margins can be improved.

In accordance with an exemplary embodiment of the invention, and for those fuel bundles in the reactor core with some PLR's, bundle flow resistance can be increased with a resulting decrease in flow by attaching unfueled followers (i.e., fuel rod extensions) to the tops of the PLR's so that geometrically (i.e., from a pressure drop point of view), they behave like the higher flow resistance FLR's.

With regard to reactivity, the PLR followers in accordance with this invention may be configured to increase or decrease reactivity as follows: (1) the followers may be filled almost entirely with single phase water to increase reactivity; or (2) The followers may be completely devoid of any hydrogen bearing material to decrease reactivity. In other words, water can be eliminated and reactivity reduced above the PLR's by using Zircaloy followers (hollow or solid) with possible gadolinium addition if even larger reactivity reduction is required.

In its broader aspects, therefore, the invention relates to a fuel bundle for a boiling water nuclear reactor comprising a plurality of fuel rods secured within an array and extending between upper and lower tie plates, and including at least one additional fuel rod extending from the lower tie plate but terminating short of the upper tie plate, the improvement comprising a removable extension rod secured to the at least one additional fuel rod and extending substantially to the upper tie plate.

Additional objects and advantages of the present invention will become apparent from the detailed description which follows.

BEST MODE FOR CARRYING OUT THE INVENTION

Figure 1:
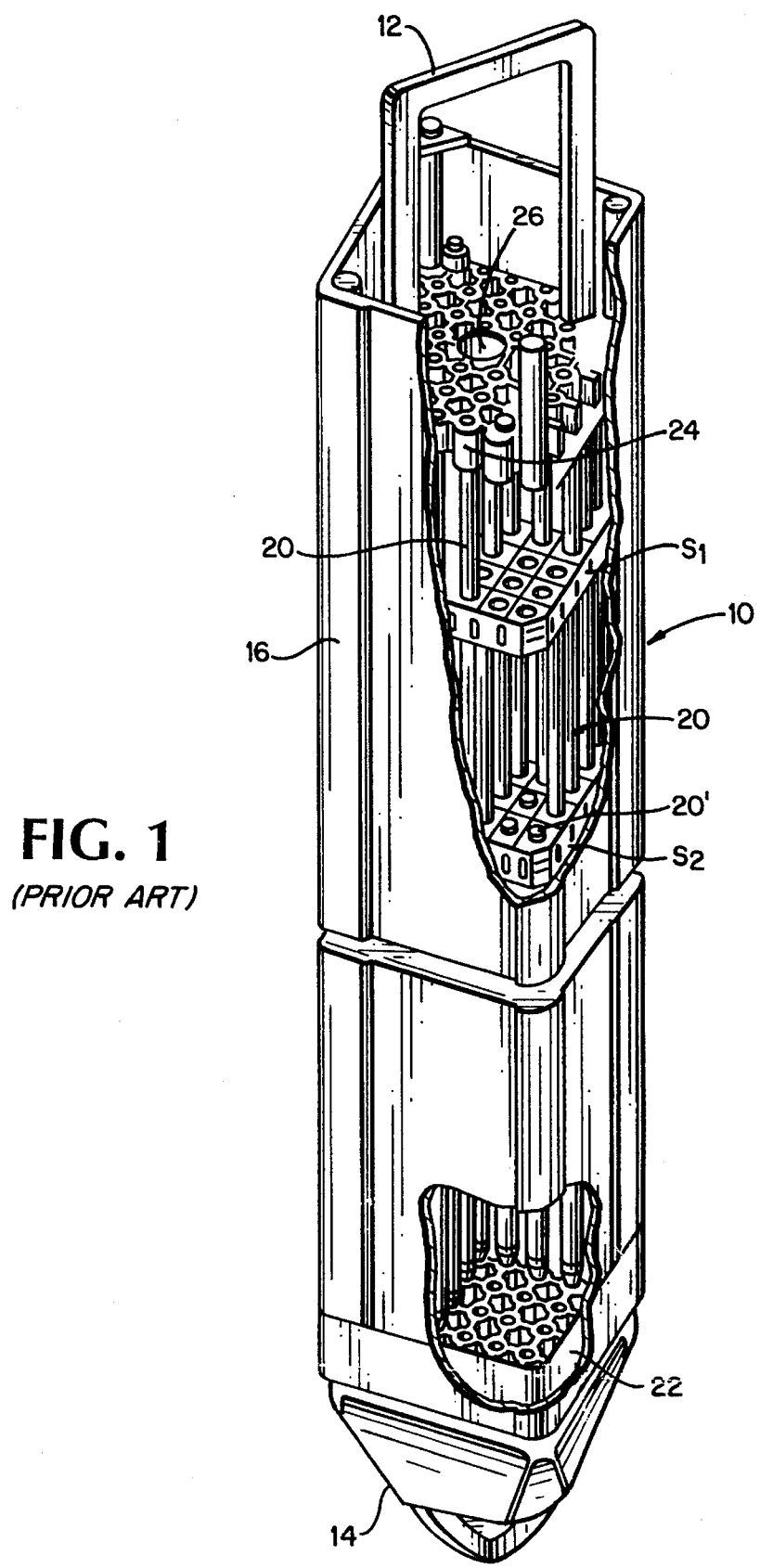
FIG. 1 is a perspective of a conventional fuel bundle assembly from a boiling water nuclear reactor incorporating partial length rods.

This invention relates to an improved fuel bundle assembly, one of which is shown in FIG. 1 at 10. It will be understood that the fuel bundle assembly is not shown in its true length, and instead is broken away so as to illustrate the bottom and top portions of the bundle only. The assembly includes an upper handle 12 and a lower nose piece 14. A channel 16 extends upwardly from the nose piece end substantially the full length of the fuel bundle assembly 10. Individual fuel rods 20 are disposed in a matrix interior of the fuel assembly, i.e., surrounded by the channel 16. The full length fuel rods (FLR's) 20 extend between a lower tie plate 22 and an upper tie plate 24 in a well known manner, whereas partial length fuel rods (PLR's) 20' extend upwardly from the lower tie plate 22 but terminate short of the upper tie plate 24 as explained in greater detail below.

The rods 20 (including PLR's 20') are normally arrayed in rows and columns. Further, and because of the length of the fuel assemblies (on the order of 160 inches), spacers, e.g., $S_1$, $S_2$-$S_N$ are placed along the length of the fuel assembly to retain the rods in the desired array and to minimize or eliminate lateral vibration of the fuel rods. Typically, seven such spacers, roughly evenly spaced at 20 inch intervals, extend from the top to the bottom of the fuel assembly.

Figure 2:
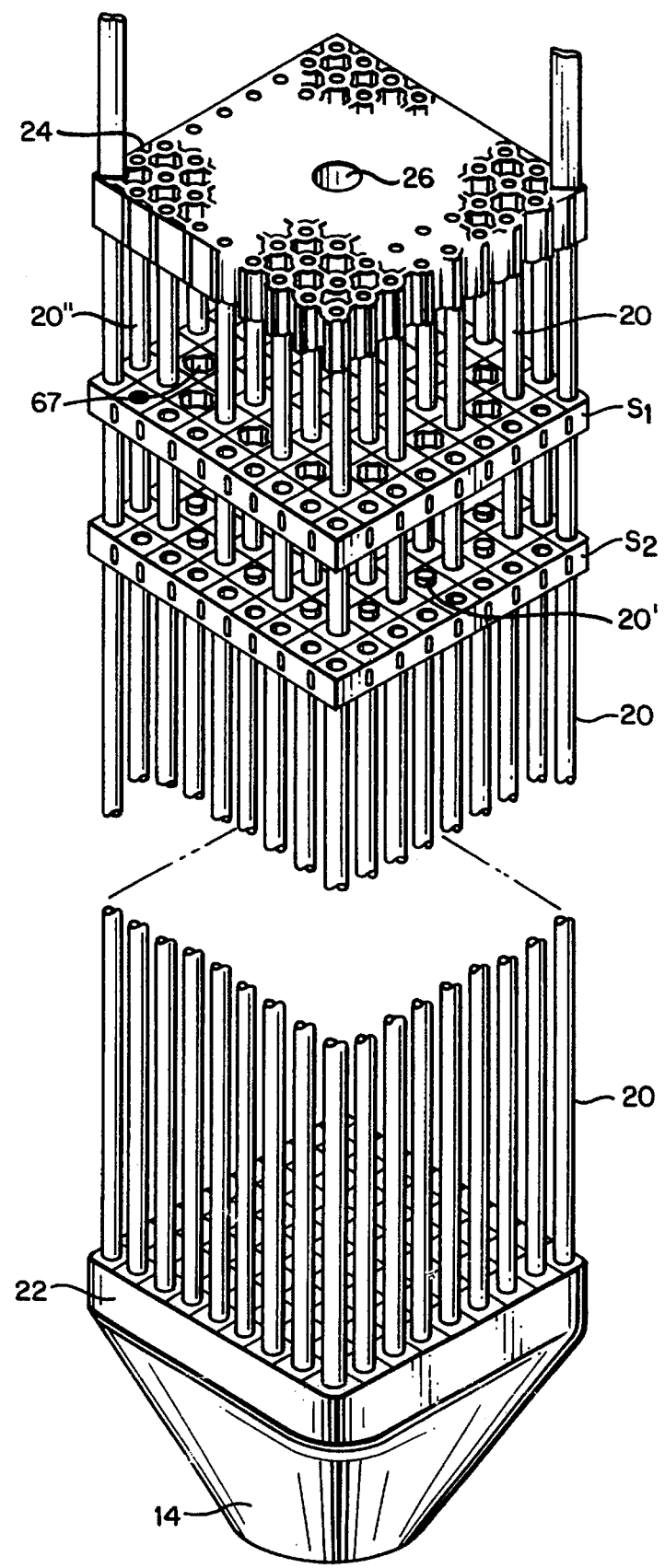
FIG. 2 is a perspective view of a conventional fuel bundle similar to that shown in FIG. 1 but with the fuel bundle channel and lifting handle removed for the sake of clarity.

As has been mentioned above, this invention relates to a new fuel bundle design for placement interior of the channels 16. Referring particularly to FIG. 2, fuel rods 20 are arranged in a 9×9 matrix or array. Were it not for the presence of the central water rod 26, eighty-one (81) individual fuel rods would extend the length of the matrix of fuel rods shown in FIG. 2.

Figure 3:
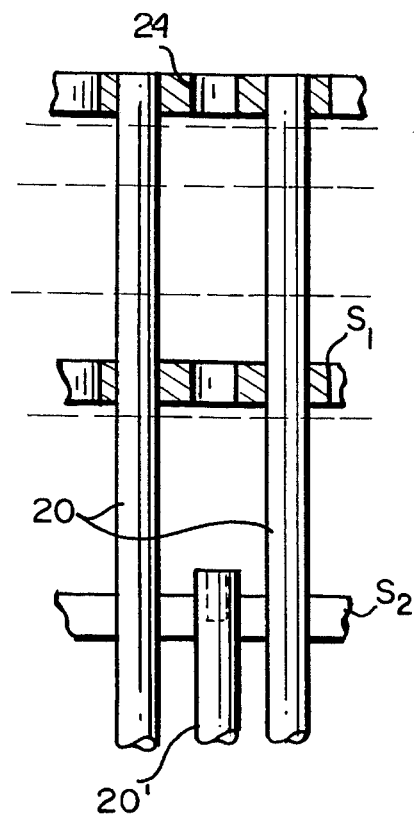
FIG. 3 is a partial enlarged detail illustrating full and partial length fuel rods in relation to a pair of fuel rod spacers as shown in FIG. 2.
Figure 4:
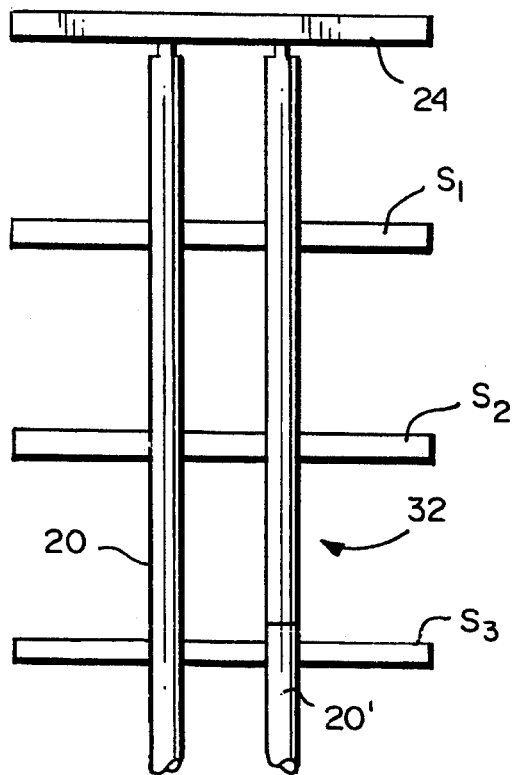
FIG. 4 is a partial enlarged detail similar to that illustrated in FIG. 3, but incorporating the removable rod extension in accordance with this invention, attached to a partial length fuel rod terminating adjacent a third fuel rod bundle spacer.

The invention constitutes modifying preferably the upper two thirds of the fuel assembly. Specifically, the invention here relates to the modification of the PLR's 20' which extend at least one-half of the length of the fuel assembly. As already noted, the PLR's 20' extend from the bottom tie plate 22 and extend upwardly toward the upper tie plate 24. The PLR's terminate short of the upper tie plate 24, however, preferably adjacent a spacer, e.g., $S_2$ as shown in FIGS. 1–3; and $S_3$ as shown in FIG. 4. For purposes of this invention, it is not important where the PLR's terminate, although PLR's will typically extend into the upper two phase region of the bundle.

It is preferred that the PLR's 20' be located at least within the second row of the array removed from the channel 16. In order to illustrate the location of these PLR's in the perspective of FIG. 2, the first row of rods has been omitted from that portion of the perspective that is towards the viewer. What the viewer sees, then, is the second row of rods. The invention here, however, is not limited to any particular location for the PLR's within the bundle.

With reference now to FIG. 4, a removable extension rod, or unfueled follower 32, is secured to the upper end of a PLR 20', extending upwardly from spacer $S_3$ through spacers $S_1$ and $S_2$ to the upper tie plate 24 where they are secured by any suitable means. A similar follower or extension would be installed for each PLR 20' in the bundle.

The followers or extension rods 32 may be secured to the uppermost ends of the PLR's 20' by any suitable fastening means such as a bayonet joint, screw threads or the like. The followers or extension rods 32 may be secured at their upper ends directly to the upper tie plate 24, or they may terminate or a few inches above the uppermost spacer $S_1$, depending on the design of the upper tie plate. In other words, if the upper tie plate 24 is not designed to accommodate such followers, the latter can simply terminate short of the tie plate, adjacent the uppermost spacer $S_1$. The followers or extension rods 32 may be tubular or solid in form, depending on desired reactivity characteristics as discussed below. It also may be desirable to have a number of such unfueled followers or rod extensions 32 attached to each other to facilitate easy removal from the bundle during a reactor outage.

From a geometric standpoint, it will be appreciated that PLR's 20' with extensions 32 mimic FLR's 20 in terms of coolant pressure drop particularly in the two phase region of the channel, by increasing flow resistance and decreasing flow.

In further accordance with the invention, power of reload bundles incorporating the extensions 32 can be adjusted to better match power requirements of the existing fuel bundles in the core. For example, the extensions 32 may be provided as hollow Zircaloy tubes and filled almost entirely with a single phase water in order to increase reactivity, i.e., increase power. On the other hand, the extensions 32 (solid or hollow) may be devoid of any hydrogen bearing material to thereby decrease reactivity and decrease power. Reactivity may be further reduced via addition of gadolinium (via natural uranium, for example) to a hollow Zircaloy follower. By thus being able to adjust both bundle flow and reactivity characteristics, control rod movement can be minimized and operating margins improved.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a fuel bundle for a boiling water nuclear reactor comprising a plurality of fuel rods secured within an array and extending between upper and lower tie plates, and including at least one additional fuel rod extending from said lower tie plate but terminating short of said upper tie plate, the improvement comprising a removable extension rod secured to said at least one additional fuel rod and extending substantially to said upper tie plate.

2. The fuel bundle of claim 1 wherein a plurality of spacers are provided at axially spaced locations along said bundle and wherein said at least one additional rod terminates adjacent and above an upper edge of one of said spacers.

3. The fuel bundle of claim 1 wherein said extension rod is secured to the top of said at least one additional rod such that said extension rod and said at least one additional rod are substantially co-linear.

4. The fuel bundle of claim 1 wherein said extension rod is hollow and filled substantially with single phase water to increase reactivity.

5. The fuel bundle of claim 1 wherein said extension rod is substantially devoid of any hydrogen bearing material.

6. The fuel bundle of claim 5 wherein said extension rod is formed of solid Zircaloy material.

7. The fuel bundle of claim 5 wherein said extension rod is formed of Zircaloy material in tubular form, and wherein gadolinium is added to further reduce reactivity.

8. In a fuel bundle for a nuclear reactor having fuel rods secured with an array and extending generally axially between upper and lower tie plates, and a plurality of spacers at axially spaced locations along said bundle holding said fuel rods in the array, said fuel rods including a first plurality of full length rods secured at lower ends thereof to the lower tie plate and at upper ends thereof to the upper tie plate, and a second plurality of partial length rods secured at lower ends thereof to the lower tie plate, with upper ends thereof terminating above and adjacent one or more of said spacers, the improvement comprising fuel rod extension members removably attached to at least some of the plurality of partial length fuel rods such that said at least some of the plurality of partial length fuel rods extend substantially to said upper tie plate, and such that said fuel rod extension members can be removed from the bundle independently of the partial length fuel rods to which they are attached.

9. The fuel bundle of claim 8 wherein said fuel rod extension members are formed of solid Zircaloy material.

10. The fuel bundle of claim 8 wherein said fuel rod extension members are formed as hollow tubes.

11. The fuel bundle of claim 10 wherein said fuel rod extension members contain single phase water.

12. The fuel bundle of claim 10 wherein said fuel rod extension members contain gadolinium.

13. In a fuel bundle for a nuclear reactor having fuel rods secured within an array and extending generally axially between upper and lower tie plates, and a plurality of spacers at axially spaced locations along said bundle holding said fuel rods in the array, said fuel rods including a first plurality of full length rods secured at lower ends thereof to the lower tie plate and at upper ends thereof to the upper tie plate, and a second plurality of partial length rods secured at lower ends thereof to the lower tie plate, with upper ends thereof terminating above and adjacent one of said spacers, the improvement comprising means for causing all of said fuel rods to behave similarly relative to coolant flow pressure drop in the channel, and associated means for varying reactivity of the second plurality of partial length rods.

* * * * *